Oct. 19, 1965    P. G. PRITZ    3,213,264
HEATER FOR METALLIC DISCS
Filed Aug. 6, 1963    3 Sheets-Sheet 1
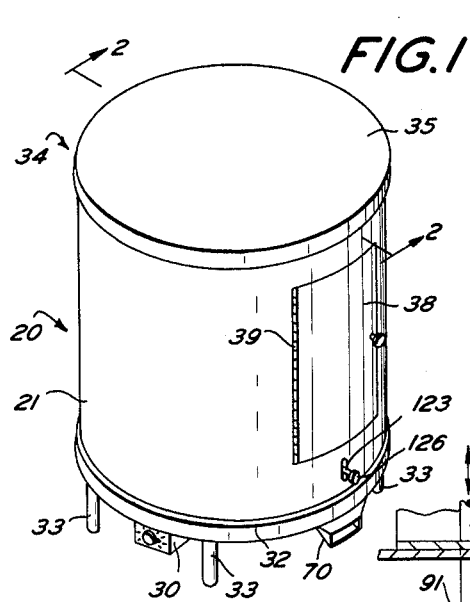
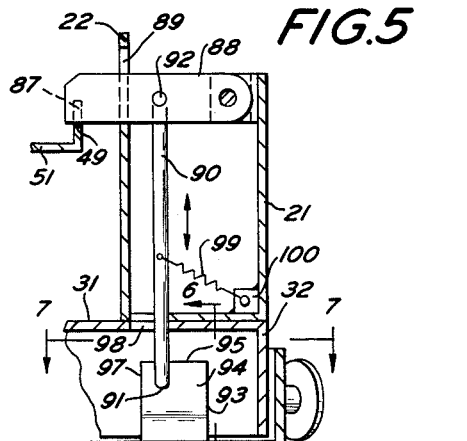
INVENTOR.
PETER G. PRITZ
BY
B. T. Wobensmith
ATTORNEY Oct. 19, 1965  P. G. PRITZ  3,213,264
HEATER FOR METALLIC DISCS
Filed Aug. 6, 1963  3 Sheets-Sheet 2
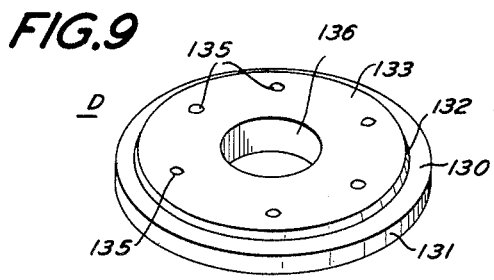
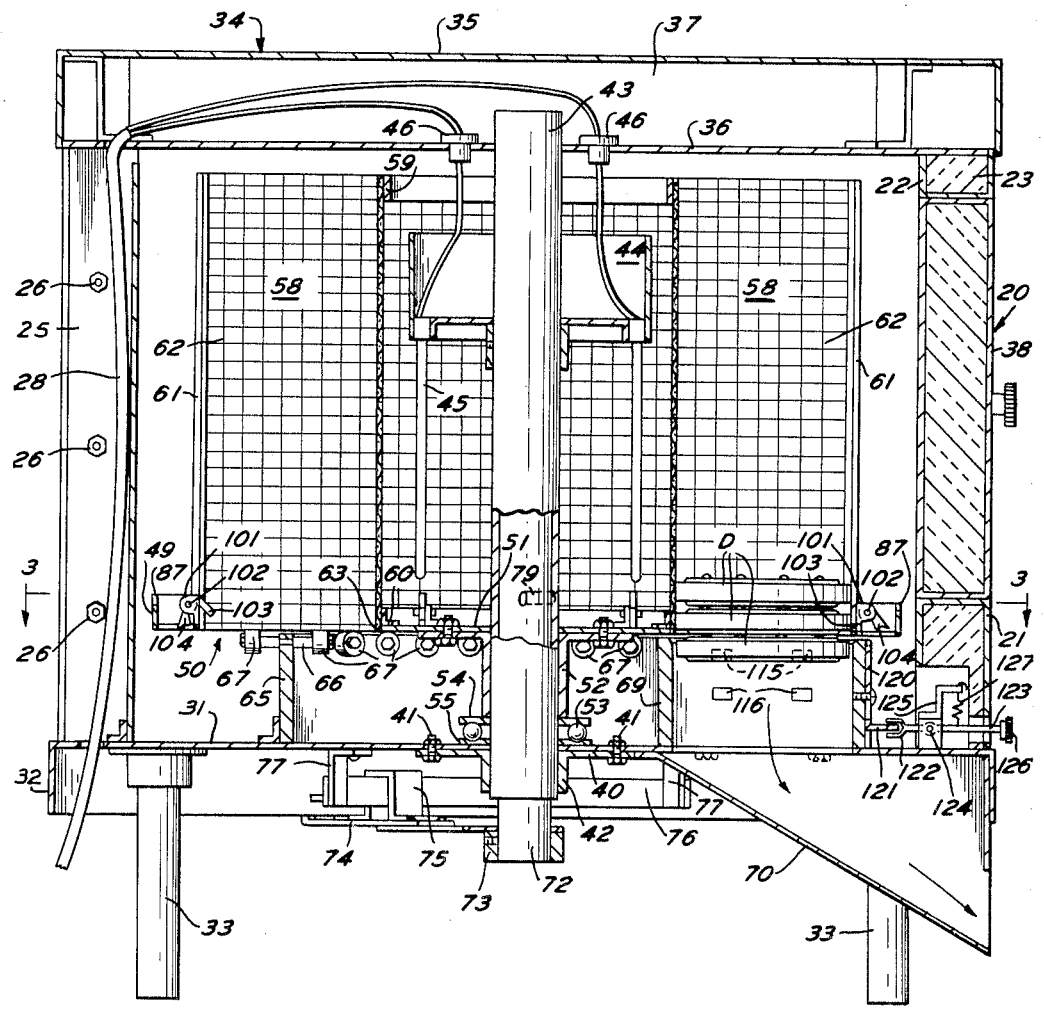
INVENTOR.
PETER G. PRITZ
BY
ATTORN Oct. 19, 1965 P. G. PRITZ 3,213,264
HEATER FOR METALLIC DISCS
Filed Aug. 6, 1963 3 Sheets-Sheet 3
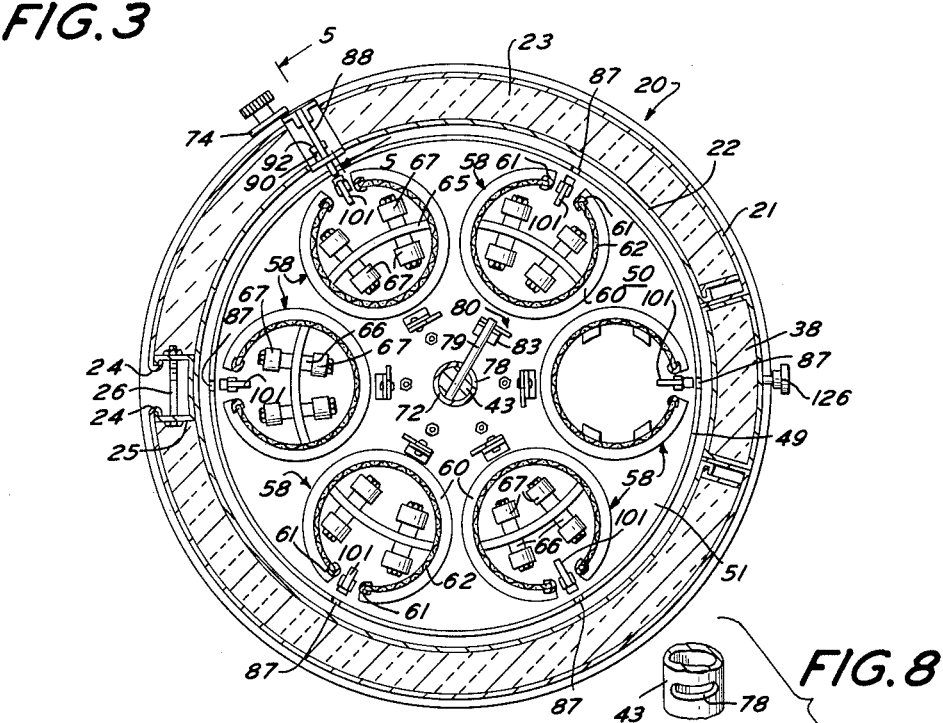
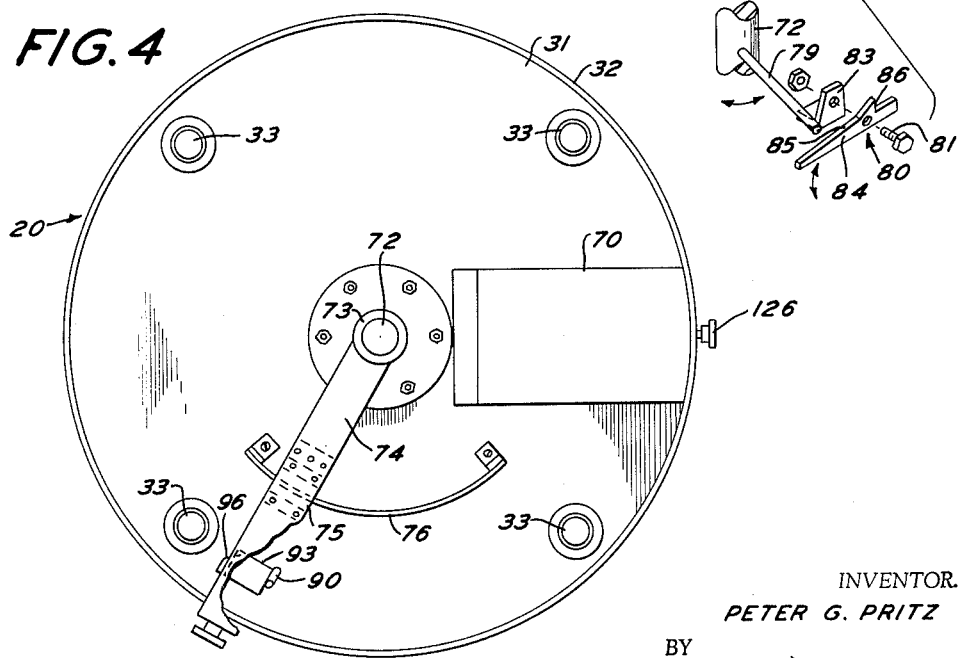
INVENTOR.
PETER G. PRITZ
ATTORNEY United States Patent Office 3,213,264
Patented Oct. 19, 1965

3,213,264
HEATER FOR METALLIC DISCS
Peter G. Pritz, Jenkintown, Pa. (% Trico Non Ferrous Metal Products Inc., Wyandotte Road, Willow Grove, Pa.)
Filed Aug. 6, 1963, Ser. No. 300,200
9 Claims. (Cl. 219—214)

This invention relates to heaters and more particularly to heaters for metallic discs and structure for selectively delivering a heated disc from the heater, as desired.

Metal discs have been employed for retaining individual plates of food in heated condition while in transit from the kitchen to a remote location such as a hospital room or hotel room.

It is the principal object of the present invention to provide a heater particularly for metallic discs having structure for retaining the discs during heating, retaining the discs in heated condition for use, and separating and discharging a heated disc when desired.

It is a further object of the present invention to provide a heater of the character aforesaid having a large storage capacity.

It is a further object of the present invention to provide, in a heater for metallic discs, a rotatable carriage and simple but effective structure for delivering one or more heated discs therefrom as desired.

It is a further object of the present invention to provide a heater for metal discs, and apparatus for positive control of the delivery of a heated disc.

It is a further object of the present invention to provide, in a heater for metallic discs, improved structure for supporting and selectively discharging discs as desired.

Other objects and advantageous features of the invention will be apparent from the description and claims.

The nature and characteristic features of the invention will be more readily understood from the following description, taken in connection with the accompanying drawings forming part thereof in which:

FIGURE 1 is an exterior view in perspective of a heater in accordance with the invention;

FIG. 2 is a vertical sectional view, enlarged, taken approximately on the line 2—2 of FIG. 1;

FIG. 3 is a horizontal sectional view, on a smaller scale, taken approximately on the line 3—3 of FIG. 2;

FIG. 4 is an underneath plan view;

FIG. 5 is a fragmentary sectional view taken approximately on the line 5—5 of FIG. 3 and showing a latching mechanism for the carriage;

FIG. 6 is a vertical sectional view taken approximately on the line 6—6 of FIG. 5;

FIG. 7 is a horizontal sectional view taken approximately on the line 7—7 of FIG. 5;

FIG. 8 is an exploded perspective view of the carriage impelling mechanism;

FIG. 9 is a view in perspective of a preferred form of metal disc for use with the heater;

FIG. 10 is a stop plan view of a preferred form of disc delivery mechanism removed from the heater;

FIG. 11 is a side view of the disc delivery mechanism of FIG. 10;

FIG. 12 is a front elevational view of the disc delivery mechanism of FIG. 10;

FIG. 13 is a vertical sectional view, enlarged, taken approximately on the line 13—13 of FIG. 12 showing the disc delivery mechanism immediately following disc delivery; and FIG. 14 is a view similar to FIG. 13 showing the disc delivery mechanism ready for disc delivery.

It should of course, be understood that the description and drawings are illustrative merely and that various modifications and changes can be made in the structure disclosed without departing from the spirit of the invention.

Like numerals refer to like parts throughout the several views.

Referring now more particularly to the drawings a housing 20 is provided having an outer cylindrical wall 21, an inner cylindrical wall 22, with suitable heat insulating material 23, such as glass fibers, therebetween. The outer wall 21 can have vertical margins 24 hooked over a vertical channel 25 which is secured to the inner wall 22 and vertically spaced horizontal bolts 26 can be provided to retain the channel 25 in stable relation. The interior of the channel 25 provides a location for disposition of electrical cable 28 which is connected to a controller 30. The controller 30 can be an adjustable temperature level setting device of known type.

The housing 20 is closed at the bottom by a bottom wall 31 having a skirt 32, and a plurality of spaced legs 33 can be provided secured to and extending downwardly from the bottom wall 31.

A top wall 34 is provided having upper and lower wall plates 35 and 36 with a space 37 therebetween for the conductors of the cable 28 and for heat insulation.

An access door 38 to the interior of the housing is provided mounted on the outer wall 21 by a hinge 39.

The bottom wall 31 has a horizontal support plate 40 secured thereto by bolts 41. The plate 40 has a sleeve 42 to which a vertical frame tube 43 is fixedly secured, the frame tube 43 extending upwardly and through the wall plate 36.

The frame tube 43 immediately below the upper end thereof has a heating electrode cage 44 secured thereto for supporting a resistance heating element 45 to which the conduit 28 extends for supplying electrical energy for heating. The wall 36 can be provided with ceramic insulating sleeves 46 if desired, for the separate conductors of the cable 28.

A carriage 50 is provided having a bottom wall or floor 51 carried on a carriage mounting sleeve 52 on the frame tube 43, a ball bearing 53 being interposed between an upper bearing flange 54 extending from the sleeve 52 and a bearing plate 55 on the bottom wall 51. The carriage floor 51 has an upwardly extending marginal rim 49.

The carriage 50 is provided, at spaced intervals with upright open disc receptacles 58 of any desired type.

The disc receptacles 58, in a preferred embodiment each includes an upper collar 59, a lower collar 60, spaced U-shaped channels 61 therebetween and a cylindrical screen 62 with vertical margins extending into the channels 61 and connected at the top and bottom to the collars 59 and 60. The screen 62 permits radiant and convection heating of the discs D as hereinafter explained. The floor 51 of the carriage 50 has disc delivery openings 63 therethrough at each of the receptacles 58.

The carriage 50 in addition to its central support at the sleeve 52 is also supported by a carriage support ring 65 concentric with the frame tube 43 which carries horizontal stub shafts 66 having rollers 67 thereon for engagement with the bottom face of the floor 51.

The bottom wall 31 at the location for delivery of the discs D has a discharge tube 69 carried thereon with an inclined discharge chut 70 extending therefrom for disc delivery.

In order to position the carriage 50 for disc delivery a vertical carriage actuating shaft 72 is provided in the frame tube 43, extends downwardly therebelow and has a collar 73 connected thereto. An operating lever 74 extends radially outwardly from the collar 73 and beyond the skirt 32 for manual access and operation. The lever 74 is supported intermediate its ends by a bracket 75 which slides on an arcuate bar 76 having end supports 77. The end supports 77 are connected to the bottom wall 31 and serve to limit the extent of movement of the lever 74.

The frame tube 43 above the carriage floor 51 has a horizontal slot 78 and an actuating rod 79 carried by the shaft 72 extends therethrough for engagement with a detent 80 carried by a bolt 81 and nut 82 on a detent bracket 83. It will be noted that detent brackets 83 and detents 80 are provided for each disc receptacle 58.

Each detent 80, as shown in detail in FIG. 8, has an arm 84 with an inclined upper face 85 to permit movement of the rod 79 thereover in one direction and an upright locking edge 86 for engagement by the rod 79 to effect turning of the carriage 50.

In order to lock the carriage 50 at the respective locations for disc delivery, the rim 49 is provided with latching notches 87 for engagement by a latch 88 pivotally mounted on the wall 21 and extending through a slot 89 in the wall 22, which slot 89 limits sidewise and vertical movement of the latch 88.

The latch 88 is controlled as to its positioning for latching and latch release by a latch actuating rod 90 (see FIGS. 5, 6 and 7) which has a lower terminal end 91 and which is pivotally mounted on the latch 88 intermediate its ends by a horizontal pivot portion 92 transverse to the latch 88.

The actuating lever 74 has a cam bracket 93 secured thereto with an inclined or latch releasing portion 94 engageable by the end 91, an elevated horizontal latch hold up portion 95 engageable by the end 91, a rear edge portion 96 which permits the rod 90 to drop as the end passes therebeyond, and a side marginal edge 97 which permits the return of the cam bracket 93 by sidewise swinging of the rod 90 (see FIG. 7). The rod 90 extends downwardly through a slot 98 which limits the movement of the rod 90 but permits the swinging for return of the cam bracket 93. A spring 99 connected at one end to the rod 90 and at the other end to a spring connector 100 on the wall 31 urges the rod 90 to its upright position but permits the swinging of the rod 90 for cam bracket return.

Each of the disc receptacles 58 is provided between the channels 61 with a disc retainer lever 101 pivotally carried on the carriage floor 51 by a pivot pin 102. The lever 101 has a detector finger 103 which tends to swing inwardly when no disc D is in contact therewith and controls the positioning of a disc release preventing finger 104. The finger 104 when in its downward position as shown in the disc receptacle 58 to the left in FIG. 2 provides an indicator that the receptacle 58 from which discs have been withdrawn is empty and at the same time retains a disc D in the discharge tube 69 so that the disc D in the next receptacle 58 moved thereover cannot fall or tilt toward the fingers 115 but is controlled in its downward movement.

Referring now more particularly to FIGS. 10 to 14, inclusive, the disc discharge mechanism is there illustrated in detail in its relation to the discharge tube 69 and chute 70.

The discharge tube 69 has integral side blocks 110 exteriorly formed thereon with the opposite horizontal pinion shafts 111 therein having a pair of horizontal upper racks 112 and a pair of horizontal lower racks 113 on each side with which pinions 114 are in operating engagement. The upper racks 112 have disc supporting fingers 115 and the lower racks 113 have disc supporting fingers 116.

The pinion shafts 111 have operating arms 117 secured to their outer ends. The arms 17 have pins 118 which engage in slots 119 of an operating head 120 which is slidably mounted on the discharge tube 69 for vertical oscillatory movement. The head 120 has a ledge 121 which is engaged by a fork 122 on a discharge control lever 123. The lever 123 is pivotally mounted on a pivot pin 124 carried on a bracket 125 on the bottom wall 31, and extends beyond the outer wall 21, and has an operating knob 126 accessible for manual manipulation. A spring 127 connected to the lever 123 and to the bracket 125 provides a restoring force on the lever 123. The racks 112 and 113 by their alternate inward and outward movement provide a controlled support and delivery of discs D as hereinafter explained.

While any desired form of disc D can be employed the disc D shown in detail in FIGS. 9, 13 and 14 have been found particularly suitable. The disc D as illustrated has a central cylindrical section 130 with a side edge 131 and two frusto-conical sections 132 above and below the central section 130 with flat upper and lower faces 133. One of the faces 133 is provided with a plurality of protuberances 135 to insure a spacing between the discs D in stacked condition, for heat transfer, while at the same time inwardly of the side edges 131 access is available for the rack fingers 115 and 116. The disc D also preferably has a central opening 136.

The mode of operation will now be pointed out.

The disc receptacles 58 are loaded with discs D through the door 38 which is then closed.

Electrical energy supplied through the cable 28 from any suitable source to the heating element 45, and controlled by the controller 30 provides heat to heat the discs D to the desired temperature.

The carriage 50 can be assumed to be held against rotation by the latch 88 in engagement with one of the locking notches 87. If this is not the case it can be readily moved to a latched position as pointed out below.

The latch 88 holds the carriage 50 with one of the disc receptacles 58 in alignment above the discharge tube 69.

If now it is desired to release a disc D the knob 126 of the lever 123 is moved downwardly. This movement through the lever 123, the fork 122, the ledge 121, the operating head 120, and the operating arms 117 turns the shafts 111 and partially rotates the pinions 114. This movement is effective to retract the lower holding fingers 116 while at the same time the fingers 115 are moved inwardly beneath the disc D next above the disc held by the fingers 116.

Upon retraction of the fingers 116 from the positions shown in FIG. 14 to the positions shown in FIG. 13 the lowermost disc D falls through the discharge tube 69 and into the chute 70 for discharge for use. At the same time the fingers 115 retain the pile of discs D, ready for the delivery of the disc D at the bottom onto the fingers 116 upon return of the lever 123 and the operating head 120 positioned thereby to their initial positions.

Repeated manipulation of the lever 123 will effect the delivery of additional discs D to the discharge chute 70.

When the condition is reached that the last disc D has been removed from disc receptacle 58 it will be located below the detector finger 103 so that this finger 103 swings inwardly (see FIG. 2 at left) and the disc release preventing finger 104 swings downwardly. This positioning of the finger 104 limits the upward movement of the operating head 120 and prevents its movement to a position to release the disc D held by the upper fingers 115. A disc D is thus retained in the discharge tube 69 which provides a support for the next stack of discs D in the receptacle 58 moved thereover.

When all the discs D, other than the last disc D in a disc receptacle 58 which is vertically aligned with the discharge tube 70, have been discharged the carriage 50 is shifted angularly to bring the next receptacle 58 to a position for disc delivery. This is effected by manipulation of the lever 74.

The lever 74 upon initiation of its arcuate movement is effective by engagement of the cam bracket portions 94 and 95 with the terminal end 91 of the latch actuating rod 90 to raise the latch 88 from engagement with the locking notch 87 in which it had been seated and hold this latch above the rim 49 to permit free movement of the lever 74 and the carriage 50.

At the same time that the latch 88 is moved to a released position, the rotation of the shaft 72 moves the rod 79 along the detent 80 to a position to engage the locking edge 86.

Upon return movement of the lever 74 the rod 79 by its engagement with the locking edge 86 turns the carriage 50 to bring another disc receptacle to a position above the discharge tube 69 for disc delivery.

As the lever 74 is returned the latch actuating rod 90 has swung around its pivotal portion 92, engaged with the side edge 97 and the latch 88 urged downwardly by the spring 99 engages the next locking notch 87 which moves to it upon turning of the carriage 50.

Discs D can then be delivered as before, and as they are removed from a particular disc receptacle 58 another disc receptacle 58 can be advanced by movement of the actuating lever 74.

It will also be seen that apparatus has been provided for effectively carrying out the objects of the invention.

I claim:

1. A heater for metallic discs comprising
a housing,
a horizontal carriage in said housing,
means for mounting said carriage for rotation in said housing about a central vertical axis,
said carriage having a plurality of disc receptacles carried thereon for retaining a plurality of discs in vertical stacks,
said disc receptacles being open at the bottom,
members mounted in said housing at fixed locations beneath said disc receptacles for supporting of discs in said disc receptacles,
an electric heating element in said housing for heating said discs,
a discharge member at the lower part of said housing and having a delivery tube,
members for delivering a disc at the bottom of a stack in said receptacle to said discharge member,
said delivery members including upper and lower disc engaging fingers movable in said tube alternately in supporting engagement with the lowermost disc of the stack and next to the lowermost disc of the stack, and
members for moving said carriage to position said disc receptacles for disc discharge.

2. A heater as defined in claim 1 in which
members are provided in said housing with which members on said carriage are releasably engageable for locking said carriage at positions for disc discharge.

3. A heater as defined in claim 2 in which
said members for moving said carriage have actuating connections for releasing said members for locking said carriage.

4. A heater as defined in claim 1 in which
said delivery members include upper horizontally oppositely movable portions and lower horizontally movable portions,
said portions each include a rack, and
a pinion is provided between and engaging said racks for actuation thereof.

5. A heater for metallic discs comprising
a housing having side, top and bottom walls,
a central tubular frame member in said housing supported by said bottom wall,
a horizontal carriage in said housing mounted on said frame member for rotation,
said housing having a disc discharge member at the lower part thereof,
a plurality of vertical disc receptacles, on said carriage for retaining said discs in a vertical stack,
an electrical heating element in said housing for heating said discs,
members for moving said carriage to successively position said disc receptacles for disc discharge to said disc discharge member,
members for separating a disc from the bottom of a stack at said discharge member, and
a member for preventing the discharge of the last disc in said disc discharge member in alignment below a disc receptacle.

6. A heater as defined in claim 5 in which
said members for separating a disc for delivery include a tubular discharge member, and
horizontally movable disc engaging fingers movable into and out of said tubular discharge member.

7. A heater as defined in claim 5 in which
said members for separating a disc from a stack for delivery include a tubular discharge member having upper and lower disc engaging fingers alternately movable transversely therein for alternately supporting the lowermost disc and next to the lowermost disc of the stack at said tubular discharge member, and
operating devices for moving said fingers into and out of disc engagement.

8. A heater as defined in claim 5 in which
said members for separating a disc from a stack for delivery include a tubular discharge member having upper and lower horizontally movable disc engaging fingers alternately movable into supporting engagement with the lowermost and next to the lowermost disc in a stack of discs at said tubular discharge member, and
operating devices for said fingers including
racks at each side of said tubular member by which said fingers are carried,
a pinion in engagement with the racks at each side,
an operating head on the tubular discharge member,
operating connections between said head and said pinions, and
members for actuating said operating head.

9. A heater for metallic discs comprising
a housing having side, top and bottom walls,
a central tubular frame member in said housing supported by said bottom wall,
a horizontal carriage in said housing mounted on said frame member for rotation,
said housing having a disc discharge member at the lower part thereof,
a plurality of vertical disc receptacles on said carriage for retaining said discs in vertical stacks, said disc receptacles being open at the bottom,
auxiliary disc supporting members at fixed locations in said housing engaging the lowermost disc in each receptacle upon rotation of said carriage,
an electric heating element in said housing for heating said discs,
members for moving said carriage to successively position said disc receptacles for disc discharge to said disc discharge member, and
members for separating a disc from the bottom of a stack at said discharge member.

References Cited by the Examiner

UNITED STATES PATENTS

| | | | |
|---|---|---|---|
| 2,248,479 | 7/41 | Miller | 221—114 |
| 2,556,852 | 6/51 | Pickering | 221—113 |
| 2,653,850 | 9/53 | Vollten | 221—113 X |
| 2,696,813 | 12/54 | Clarke | 126—246 |
| 2,834,510 | 5/58 | Cenotti | 221—150 X |
| 2,908,791 | 10/59 | Torino et al. | 219—214 |
| 3,030,483 | 4/62 | Rudolph et al. | 219—214 |

RICHARD M. WOOD, *Primary Examiner.*